United States Patent [19]

Lapeyre et al.

[11] Patent Number: 4,862,794
[45] Date of Patent: Sep. 5, 1989

[54] APPARATUS FOR CONTROLLING PRECOOKING AND MACHINE PEELING SHRIMP

[75] Inventors: George C. Lapeyre, New Orleans; Brent A. Ledet, Kenner, both of La.

[73] Assignee: The Laitram Corporation, Harahan, La.

[21] Appl. No.: 318,343

[22] Filed: Mar. 3, 1989

[51] Int. Cl.⁴ .................. A22C 29/00; A47J 27/04; A47J 43/18
[52] U.S. Cl. .................. 99/443 C; 17/48; 17/73; 99/477; 99/584; 99/516; 99/576
[58] Field of Search ........... 99/443 C, 477, 516, 99/576, 584, 403, 404, 405, 406, 339, 345; 17/48, 73, 72

[56] References Cited

U.S. PATENT DOCUMENTS

| | | | |
|---|---|---|---|
| 3,562,855 | 2/1971 | Willis | 17/48 |
| 3,581,652 | 6/1971 | Chauvin | 99/427 X |
| 3,744,406 | 7/1973 | Lapeyre | 99/516 |
| 3,871,086 | 3/1975 | Rutledge | 17/73 |
| 3,975,797 | 8/1976 | Grimes et al. | 99/443 C |
| 4,167,585 | 9/1979 | Caridis et al. | 99/443 C |
| 4,400,849 | 8/1983 | Dell | 17/73 |
| 4,417,507 | 11/1973 | Shotwell | 99/443 C |
| 4,639,976 | 2/1987 | Hansen et al. | 17/73 |
| 4,769,870 | 9/1988 | Hansen et al. | 17/73 |

Primary Examiner—Timothy F. Simone
Attorney, Agent, or Firm—James C. Kesterson

[57] ABSTRACT

Apparatus for more efficiently pre-cooking and peeling cold water shrimp such as the species *Pandalus borealis* is disclosed. The apparatus includes a conveyor for moving the shell-on or unpeeled shrimp up and out of a feeder tank. A perforated horizontal conveyor then carries the shrimp over a steam manifold with a multiplicity of apertures such that steam escapes from the manifold and rises through the perforated belt and surrounds the shrimp.

A cooking chamber which completely encloses the horizontal conveyor except at the bottom, contains the lighter-than-air steam such that the raw shell-on shrimp are at least partially cooked by the surrounding steam. Since the lighter-than-air steam excludes all air from the cooking chamber, less oxidation of fats occurs and consequently a higher quality product is obtained. The shrimp are then immediately deposited by the perforated conveyor at the entry point of an automatic shrimp peeling machine, such that the shrimp have their shell removed or are peeled while still hot.

8 Claims, 2 Drawing Sheets

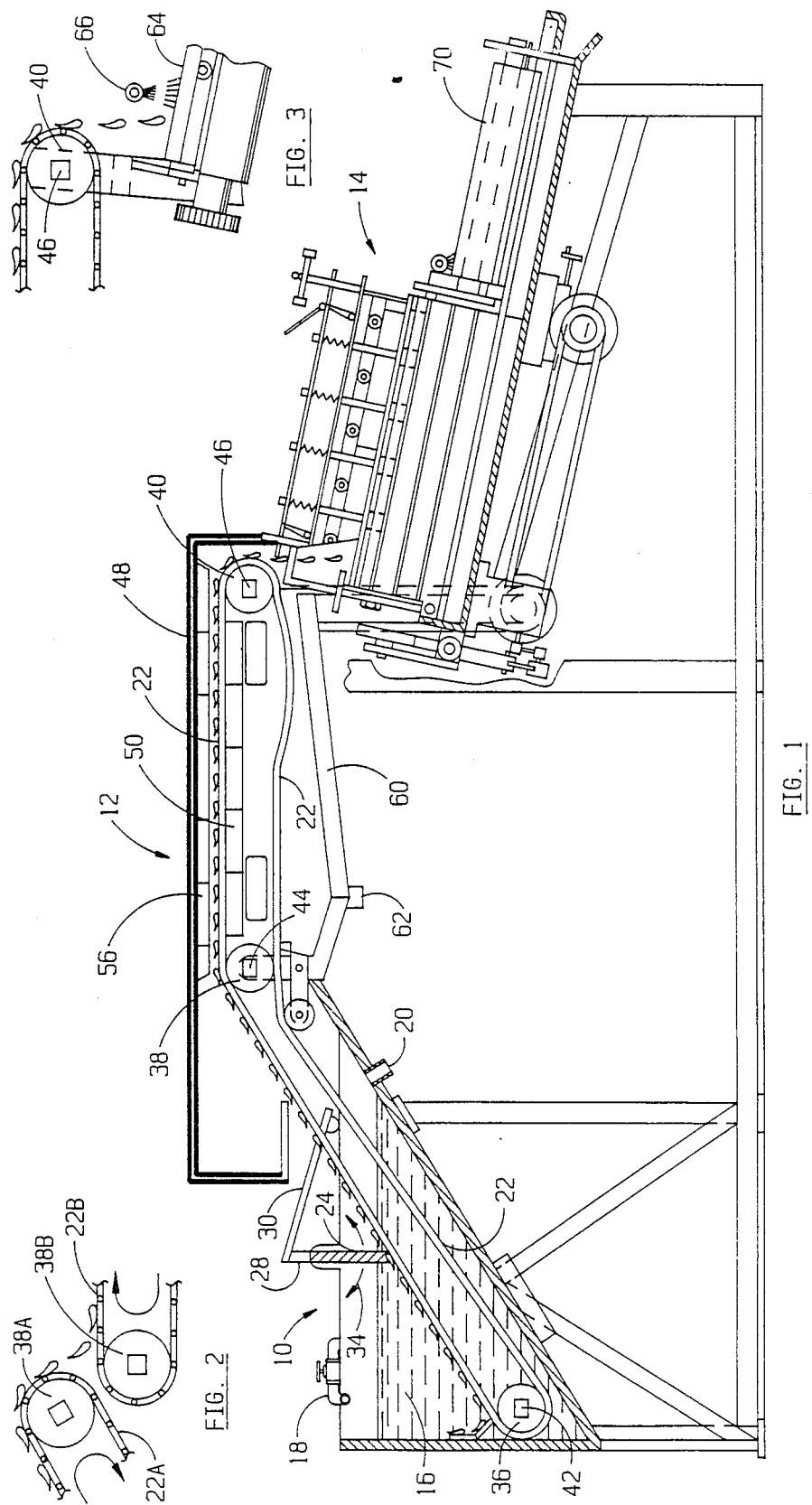

APPARATUS FOR CONTROLLING PRECOOKING AND MACHINE PEELING SHRIMP

TECHNICAL FIELD

This invention relates generally to apparatus for processing shrimp and more particularly to effective machine peeling of certain types of shrimp from northern or cold waters such as the Pandalus Borealis species of shrimp. Improved machine peeling is accomplished by new apparatus which more strictly controls and regulates the cooking of the shrimp immediately prior to machine peeling. As will be appreciated by those skilled in the art, certain species of northern type shrimp such as the Pandalus Borealis can be peeled much more efficient and with less meat loss if the shrimp are cooked prior to such peeling. And, such precooking is even more important if the shrimp are to be machine peeled. Further, even though precooking over a wide range of parameters improves the yield of the peeled shrimp, carefully controlling the cooking parameters provides significant improvement of yield over presently available techniques. The apparatus of this invention allows the cooking parameters to be carefully maintained such that even shrimp of varying sizes can be cooked at the same time with high overall yield and with excellent quality.

BACKGROUND ART

Peeling of cold water shrimp such as Pandalus Borealus has remained essentially the same since effective peeling of this type shrimp was made possible by the "Shrimp Peeling and Cooking Apparatus" invented by J. M. Lapeyre and described in U.S. Pat. No. 3,383,734 dated May 21, 1968 and reissued as U.S. Pat. No. Re. 26,971. According to that patent, a cooking hood is suspended over an inclined conveyor belt which moves unpeeled shrimp from a "feeder tank" to the entry point of an automatic shrimp peeling machine. Perforated steam pipes are located above and in close proximity to the shrimp such that escaping steam is forced under pressure from the steam pipes down onto the shrimp so as to cook the shrimp prior to the shrimp encountering the machine peeler.

U.S. Pat. No. 3,744,406 also issued to Lapeyre on July 10, 1973 provides a pivotally mounted support frame which allows cooking apparatus of the type described in U.S. Pat. No. 3,383,34 to be moved out of the way of the feeder tank for cleaning, maintenance, repair, etc.

U.S. Pat. No. 3,581,652 issued to J. A. Chauvin on June 1, 1971 disclose apparatus for preventing peeled shrimp from curling as they are cooked. More specifically, this apparatus includes upper and lower conveyor belts which move synchronously under a steam hood. The already peeled and flexible shrimp are placed on the lower conveyor belt so they are straight and noncurled. The lower conveyor belt then moves the straight or uncurled shrimp under the upper conveyor belt which contacts the shrimp from the top side such that the peeled, uncurled shrimp are maintained and held between the top and bottom belts in a straight and uncurled condition. The shrimp are then steam cooked and prevented from curling as they are moved through a cooking zone by the two upper and lower conveyor belts.

Thus, although all of the above mentioned patents are at least partially related to apparatus for cooking shrimp, the Chauvin patent is only concerned with maintaining large already peeled shrimp (Gulf or warm water shrimp are peeled more effectively before cooking) substantially straight and uncurled while being cooked. The two Lapeyre patents are related in that they are concerned with precooking cold water shrimp such as Pandalus Borealis prior to peeling. These Lapeyre patents represent the state of the art as it is and has been since about 1971. However, the present application includes improvements which result in a final product having improved quality in that it is more evenly cooked even when the size of the shrimp varies widely.

It is an object of the present invention, therefore, to provide apparatus and methods for more effectively peeling certain species of shrimp by regulating and controlling the pre-peeling cooking process.

It is another object of the present invention to provide apparatus for consistently cooking of certain northern water shrimp regardless of size.

It is yet another object of the invention to provide cooking apparatus which requires less steam for proper cooking of shrimp than previous cooking apparatuses.

SUMMARY

Other objects and advantages of the invention will in part be obvious, and will in part appear hereinafter, and will be accomplished by the present invention which provides apparatus and methods for at least partially cooking shrimp prior to automatic or machine peeling certain species of northern water shrimp such as Pandalus Borealis. The apparatus of the invention includes a means, such as a conveyor belt, for moving raw shell-on shrimp up and out of a feeder tank. A perforated conveyor belt receives the raw unpeeled shrimp from the means bringing the shrimp from the feeder tank. The perforated conveyor belt will have a level or horizontal portion of a selected length which extends between a start position where the shrimp are received from the first conveyor to a finish position at the entry end of the automatic machine peeler. Thus, by regulating the speed of the belt, the period of time the shrimp are on the horizontal section of the conveyor means can be carefully controlled. The width of the conveyor belt will typically be substantially the same as the width of the input to the machine peeler. In a preferred embodiment, instead of two separate conveyor belts, a single conveyor belt is used to both lift the shrimp out of the feeder tank and to move the shrimp along the horizontal section. The perforated conveyor belt may of course be driven by any suitable means such as a variable speed motor or the like. Also included is a steam manifold located below the perforated conveyor and which provides steam over a selected area of the perforated belt. The selected area is located between the start and finish positions and extends the full width of the perforated conveyor. A suitable steam manifold includes a top plate having a multiplicity of apertures distributed over the selected area. To provide regulated cooking, the source of steam will have means for selecting the rate of delivery, such that sufficient steam may be provided without waste. The horizontal conveying means is contained or enclosed by a device such as a hood which is open on the bottom side such that the incline conveying belt which brings the shrimp from the feeder tank may move up into the enclosure and deliver the shrimp to the horizontal perforated conveying means well within the steam enclosure. Thus, the steam enclosure will have one dimension which is greater than the distance between the start and finish positions of the horizontal conveyor and will also of course have a width sufficient to contain the perforated conveyor. Furthermore, the depth or height of the hood or steam enclosure will be sufficient such that the bottom edges of the enclosure extend well below the horizontal portion of the conveyor belt. Consequently, the lighter-than-air steam will exclude all air from the exclosure, such that the horizontal portion of the conveyor belt is completely surrounded by steam which has no way to escape except by condensation or by coming out around the bottom edges. Thus, even though the steam rises from the manifold through the perforated conveyor belt and contacts the shrimp, the belt is located sufficiently high in the container such that steam even exists below the conveyor belt. Thus, the shrimp are continuously subjected to steam at a constant temperature and pressure as they move on the perforated conveyor and consequently are cooked at substantially the same rate and for substantially the same amount of time regardless of their position on the perforated conveyor. Furthermore, since the entire horizontal portion of the conveyor is within steam, there are no cold spots on hot spots on the conveyor belt. This also results in a more even cook of the shrimp regardless of size.

BRIEF DESCRIPTION OF THE DRAWINGS

The above mentioned features as well as other features of the present invention will be more closely understood from consideration of the following description in connection with the accompanying drawings in which:

FIG. 1 is a sectional side view of the apparatus of this invention.

FIG. 2 shows an alternate embodiment for delivering shrimp from the feeder tank to the pre-peeling cooker.

FIG. 3 is an enlarged view of a portion of FIG. 1 showing the shell-on shrimp being delivered to the shrimp peeling machine.

BEST KNOWN MODE FOR CARRYING OUT THE INVENTION

Figure 5:
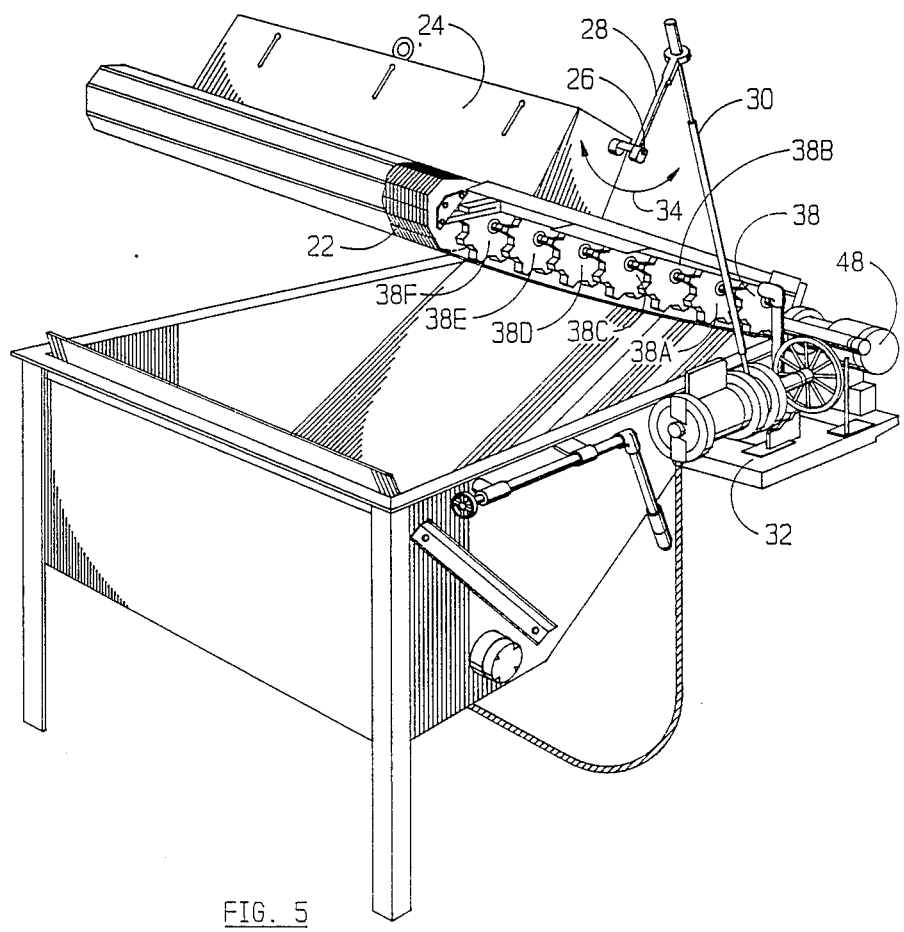
FIG. 5 is a perspective view of the "feeder tank" and means for conveying the shrimp out of the feeder tank shown in the "clean up" or maintenance position.

Referring now to the FIGS. there are shown various views of the apparatus of this invention for precooking shell-on shrimp in a controlled manner prior to being machine peeled. The apparatus includes a feeder tank with an inclined conveyor belt shown generally at 10, a cooking section or zone having a horizontal conveying belt shown generally at 12, and an apparatus for machine peeling the precooked shrimp shown generally at 14. The shrimp feeding apparatus 10 includes a feeder tank 16 which has a water supply pipe 18 and an overflow pipe 20 for maintaining the desired level of water or liquid in the tank. Mounted within the feeder tank is an inclined endless conveyor 22 for carrying the shrimp up and out of the tank 16. There is further included an oscillating feed paddle 24 above conveyor 22 secured to a rocking or reciprocating shaft 26. Extending off of the upper quadrant of shaft 26, is a rocker arm 28 which is pivotally connected to a variable length Pittman drive arm 30. The other end of the Pittman drive arm 30 is pivotally connected to a rotary drive train indicated generally at 32. The rotary drive train 32 imparts a swinging motion to the paddle 24 through arms 28 and 30 as indicated by the double-headed arrow 34. The amount of throw of each paddle swing is controlled by shortening the length of the arm 30 which is threaded to permit a variable throw. The throw of the paddle 24 determines the quantity of shrimp which the paddle by wave action deposits on the conveyor belt 22 between the paddle 24 and the cooking zone 12. Endless conveyor 22 is shown in this preferred embodiment as cooperating with drive sprockets 36, 38 and 40 mounted on square shafts 42, 44 and 46. One or both of the sprockets indicated by reference numbers 38 and 40 are compelled to rotate by means of the square shafts 44 and 46 which are in turn driven by a drive source such as the output of drive box 48 more clearly shown in FIG. 5. As best seen in FIG. 5, there are a plurality of sprockets 38, 38A through 38F spaced along their respective shafts to support and mesh with the conveyor belt 22. It will also be appreciated, that (although not visible) square shafts 42 and 46 also each support a plurality of sprockets. Although various types of conveyor belts will operate with the equipment, it has been found that a modular plastic conveyor belt composed of a multiplicity of links and which is positively driven by the sprockets provides a superior conveying system. In the embodiment as shown, one or more of the sprockets on shafts 42, 44 or 46 are secured against axial movement along the square shaft while the other sprockets on that shaft are free to move along the shaft as might be dictated by thermal expansion and contraction of the conveyor belt 22 in its movement from cold water in feeder tank 16 to the high temperature of the steam cooking apparatus 12. It should also be appreciated, that although the preferred embodiment of this invention is a single conveyor belt 22 which extends around the sprockets 36, 38 and 40, in some instances, it may be desirable to use one conveyor to move the shrimp out of the feeder tank 16, and then another conveyor to receive the shrimp from the first conveyor and then move the shrimp through the cooking chamber or zone 12 as is more clearly indicated in FIG. 2.

Figure 4:
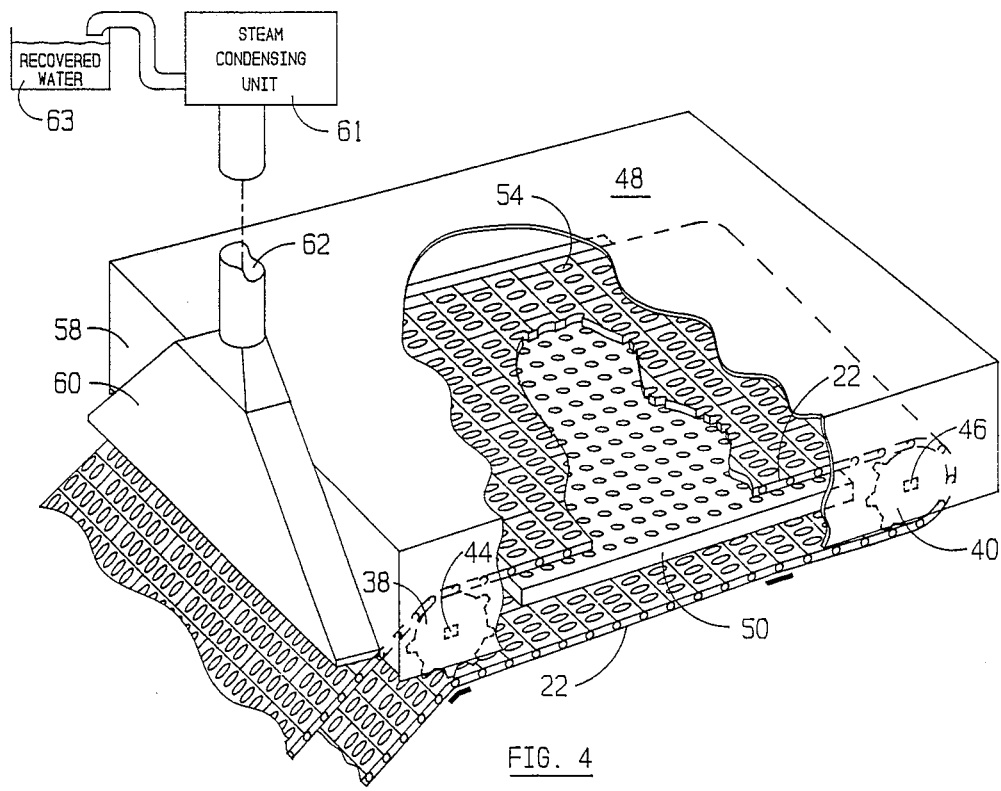
FIG. 4 is a cut-away perspective view of the steam cooker used with the present invention.

The cooker hood or cooking zone 12 as best seen in FIGS. 1 and 4, is shown as a double walled box-like structure 48 having an open bottom. Thus, as will be discussed in greater detail hereinafter, the cooking chamber or hood holds the steam for cooking similar to the way an inverted pan contains a lighter-than-air gas (saturated steam at 212° F. is, of course, a lighter-than-air gas). Because of the high temperatures that the box structure is subjected to the double wall provides insulation and helps prevent someone being burned if they come in contact with the hood. As is clearly seen from FIG. 4, there is a horizontal portion of the conveyor belt 22 which is completely contained by hood or container 48. This arrangement serves to minimize steam loss since saturated steam at atmospheric pressure is less dense than air. Therefore, the steam excludes all air from the hood or chamber 48 and completely fills the chamber. Also, as can be seen from the FIGS. 1 and 4, there is a steam manifold 50 which receives a continuous supply of steam from a source (not shown) such that steam is provided to manifold 50 where it then exits through a multiplicity of apertures such as for example the aperture 52 contained in manifold 50. As can be seen, the manifold 50 with the apertures on its upper surface allows the hot steam to escape upward through the modular plastic conveyor belt 22. Since the steam is introduced to the cooking chamber under the perforated conveyor belt, a more regular or even cooking of the shrimp occurs. This is because natural convection causes the steam to rise up through the product and fill the chamber. As can clearly be seen in FIG. 4, the plastic conveyor belt 22 is made of a multiplicity of modules each of which includes a substantial number of apertures or openings such as indicated by opening 54. Thus, as the steam escapes from manifold 50 it passes through the apertures 54 of belt 22, and shrimp being carried over the area or cooking zone defined by manifold 50 will be subjected to the steam for the necessary period of time to obtain a proper cook. It is also important to understand that unlike the prior art, cooking of the shrimp occurs in substantially a pure steam environment rather than a steam/air mixture. Such cooking in the absence of air or free oxygen eliminates oxidation of fats in the final product and the likelihood of a rancid taste developing. Thus, there is also believed to be an improvement of yield on a weight basis since free oxygen will not be free to combine with fats to produce objectionable esthers. It will be appreciated, of course, that a reduction in the volume of steam occurs as it condenses on the cold shrimp. However, by matching the flow rate of the steam into the chamber with the rate of processing the shrimp (i.e. pounds per hour), the processing can proceed with a minimum amount of escaping or lost steam. A small amount of escaping steam, however, is desirable, to assure the chamber remains full of steam and excludes air. Thus, the steam from the steam source should be carefully regulated such that just sufficient steam is provided to the manifold 50 to replace the steam that condenses on the cold shrimp and that escapes or is lost from around the bottom edges of the container 48. Also, as is shown in FIG. 1, the apparatus may include an upper or second steam manifold 56 if a faster processing rate is desired. Testing has indicated that the new apparatus of this invention will typically use no more than about ten boiler horsepower which is significantly less than prior art apparatus which required about 20 boiler horsepower. Furthermore, prior art apparatus required that the steam be provided with the same amount of manifold pressure regardless of the processing rate. This is required with the prior art systems because the steam is free to escape from under the enclosed hood and in addition, it must have sufficient pressure to force it down toward the belt so as to reach the shrimp. In the preferred embodiment of this invention the steam which escapes from around the bottom edges is directed to a single edge 58 which is shorter or provides less depth than the other edges on the enclosure. Thus, as shown in FIG. 4, there also is included a steam collector 60 attached to short edge 58 which has an outlet 62 which may be routed outside of the building for disposal. Alternately, the excess steam may be delivered to a condensing unit 61 to completely condense the escaping steam and recover the water for economy purposes as indicated by vat 63. In addition, to maintain a constant temperature of the water or liquid in feeder tank 16, there is also included a collection pan 60 under the horizontal portion of the perforated conveyor belt such that the very hot water resulting from the steam condensing can be prevented from draining into feeder tank 16. Drain 62 allows the hot water to be recirculated for reuse or to be discarded. When the shrimp reach the end of the cooking zone as designated by sprocket 40, the shrimp then fall off the edge as may better be seen from FIG. 3 and are introduced into the entry point of the shrimp machine peeler as is discussed below.

The upper or first peeling section of the shrimp peeler indicated generally by 14 consists of rubber covered main peeling rollers 64. In this first peeling section the large diameter peeling rollers 64 are typically rubber covered and have substantially the same coefficient of friction such that when properly fed and adjusted for pressure the bulk of the peeling of the shrimp is done in this upper portion. Water is introduced at the top of this peeling section by a spray pipe 66 to assist in the peeling process. A second peeling section indicated generally at 68 includes lower peeling rollers 70 which are a different character than the main peeling rollers 68 in that they are typically made of polished metal and corporate or mate with rubber covered rollers to form the peeling channels and nips for this section. This construction provides a more gentle peeling action to the shrimp which have been subjected to a more vigorous action in the first section where all of the rollers are rubber covered, and where the shells are loosened and removed as much as is possible while the shrimp are still hot and resilient.

Thus, it will be appreciated that in operating the apparatus, the conveying assembly and feeder tank 16 and paddle 24 are lowered from the "clean-up" or maintenance position shown in FIG. 5 to the operational position best seen in FIG. 1. The feeder tank 16 is then filled with water to a desired level and the shrimp to be peeled are dumped into the tank. Endless conveyor belt then starts moving and the paddle starts its oscillation action causing a wave-like action in the water to deposit the shrimp onto the conveyor mat 22 between the paddle 24 and cooking zone 12. The shrimp move up the conveyor belt and out of the feeder tank where they then pass beneath the cooking hood such that they are cooked as they move on the horizontal section of the conveyor. The shrimp are then immediately dropped into the peeling machine where they are automatically peeled.

Thus, there has to this point been described the improved apparatus and methods for automatically and machine peeling certain varieties of shrimp such as Pandalus Borealis shrimp by careful and controlled cooking of the shrimp. However, although the present application has been described with respect to such specific methods and apparatus, it is not intended that such specific references be considered limitations upon the scope of the invention except as is set forth in the following claims.

We claim:

1. Apparatus for processing certain species of shrimp comprising:
    means for moving raw shell-on shrimp out of a feeder tank;
    a perforated conveyor belt for further moving said raw shrimp, said perforated conveyor belt having a selected width and including a substantially horizontal or level portion extending between a start and finish position;
    means for driving said perforated conveyor at a selected speed;
    a steam manifold located below said perforated conveyor, said steam manifold having a multiplicity of apertures for providing steam over a selected area, said selected area extending the width of said perforated conveyor between said start and finish position;

a source of steam for providing steam to said manifold at a selected rate;

a steam enclosure, said enclosure open on the bottom side and having one dimension greater than the width of said perforated conveyor, and a second dimension greater than the distance between said start and finish positions such that said horizontal portion of said perforated conveyor is fully contained and covered by said enclosure, and said enclosure further having sufficient depth such that steam discharged from said steam manifold rises through said horizontal portion of said perforated conveyor carrying shrimp, and is contained by said enclosure such that said horizontal portion of said perforated conveyor is continuously subjected to steam so that shrimp moving on said perforated conveyor are cooked at substantially the same rate and for substantially the same time regardless of their position on said perforated conveyor; and an automatic shrimp peeler for receiving shrimp from said perforated conveyor subsequent to said shrimp passing said finish position for machine peeling said cooked shrimp.

2. The apparatus of claim 1, and further including a second steam manifold located above said perforated conveyor.

3. The apparatus of claims 1 or 2, wherein said multiplicity of apertures for providing steam extends substantially the full width of said perforated conveyor and substantially between said start and finish position.

4. The apparatus of claims 1 or 2, and further including a means for collecting hot condensate from said steam to reduce the amount of hot water entering said feeder tank so as to avoid an increase in temperature of said feeder tank.

5. The apparatus of claim 1 or 2 wherein said steam enclosure has double walls for insulation purposes.

6. The apparatus of claims 1 or 2, wherein an exhaust means is attached to said steam enclosure for exhausting steam at a selected rate from said enclosure.

7. The apparatus of claims 1 or 2, and further including means connected to said exhaust means for condensing said steam for subsequent disposal.

8. The apparatus of claims 1 or 2, wherein said means for moving and said perforated conveyor are the same conveyor.

* * * * *